United States Patent
Mayoufi Ouerghemmi et al.

(10) Patent No.: US 12,178,214 B2
(45) Date of Patent: Dec. 31, 2024

(54) SYSTEM FOR STUNNING ANIMALS USING AN ANOXIC STUNNING GAS

(71) Applicant: L'Air Liquide, Societe Anonyme pour l'Etude et l'Exploitation des Procedes Georges Claude, Paris (FR)

(72) Inventors: Nadia Mayoufi Ouerghemmi, Vitry sur Seine (FR); Ansgar Rinklake, Krefeld (DE); Marcel Brouns, Krefeld (DE)

(73) Assignee: L'Air Liquide, Societe Anonyme pour l'Etude et l'Exploitation des Procedes Georges Claude, Paris (FR)

(*) Notice: Subject to any disclaimer, the term of this patent is extended or adjusted under 35 U.S.C. 154(b) by 43 days.

(21) Appl. No.: 18/201,389

(22) Filed: May 24, 2023

(65) Prior Publication Data

US 2023/0380430 A1 Nov. 30, 2023

(30) Foreign Application Priority Data

May 30, 2022 (EP) .................................. 22176184

(51) Int. Cl.
*A22B 3/00* (2006.01)
(52) U.S. Cl.
CPC .................................... *A22B 3/005* (2013.01)
(58) Field of Classification Search
CPC .................................. A22B 3/00; A22B 3/005
USPC ......................................................... 452/66
See application file for complete search history.

(56) References Cited

U.S. PATENT DOCUMENTS

| | | | | |
|---|---|---|---|---|
| 5,788,567 | A | * 8/1998 | Chang | H05K 7/20181 454/187 |
| 6,174,228 | B1 | * 1/2001 | Grimsland | A22B 3/00 452/66 |
| 7,448,943 | B1 | * 11/2008 | Woodford | A22B 3/086 452/66 |
| 2010/0218539 | A1 | 9/2010 | Homma et al. | |
| 2018/0289022 | A1 | * 10/2018 | Dennett | A22B 3/005 |

FOREIGN PATENT DOCUMENTS

| | | |
|---|---|---|
| EP | 0 622 021 | 11/1994 |
| JP | S56 58437 | 5/1981 |

OTHER PUBLICATIONS

EP Search Report and Written Opinion for EP 22 17 6184, mailed Nov. 28, 2022.
Wikipedia, "Dry Ice—Wikipedia," URL:https://en.wikipedia.org/w/index.php?title=Dry_ice&oldid=1089321777, May 23, 2022, pp. 1-11.

\* cited by examiner

*Primary Examiner* — Richard T Price, Jr.
(74) *Attorney, Agent, or Firm* — Yan Jiang

(57) ABSTRACT

A method for stunning animals and a respective stunning system is disclosed. Animals are lowered in a cradle into a pit filled with anoxic stunning gas. The cradle is provided with a heat sink, preferably comprising solid carbon dioxide, for cooling the stunning gas in the pit resulting in a density increase of the stunning gas in the pit. This reduces demixing of the stunning gas and rising of components such as nitrogen ($N_2$) usually having a lower density than the air surrounding the stunning system.

15 Claims, 2 Drawing Sheets

SYSTEM FOR STUNNING ANIMALS USING AN ANOXIC STUNNING GAS

CROSS-REFERENCE TO RELATED APPLICATIONS

This application claims the benefit of priority under 35 U.S.C. § 119 (a) and (b) to EP patent application No. EP 22176184.4, filed May 30, 2022, the entire contents of which are incorporated herein by reference.

FIELD OF THE INVENTION

Subject matter of the present invention is a method for stunning animals before slaughter and a stunning system by lowering the animals into a pit filled with stunning gas, wherein the stunning gas in the pit is cooled.

BACKGROUND

Systems for stunning animals by exposing the animals to a stunning gas are known. These systems are usually a dip-lift system, in which the animals are entered into a cradle which is lowered in a vertical direction into a pit filled with stunning gas from which the cradle is raised in a vertical direction after the animals lost consciousness. An alternative to a dip-lift system is a paternoster system in which several cradles are used simultaneously, e.g., based on a Ferris wheel type motion of cradles which moves several cradles, lowering groups of animals in a cradle successively into a pit filled with stunning gas with stops to empty the unconscious animals and load a new set of conscious animals.

As a stunning atmosphere, several options are used. In one alternative, a concentration of at least 80 Vol.-% carbon dioxide ($CO_2$) is used. This results in good meat quality while being considered critically in view of animal welfare as animals react aversively when inhaling an atmosphere with a high concentration of carbon dioxide. As an alternative, stunning atmospheres comprising noble gases such as argon and nitrogen are used that induce unconsciousness by anoxia. An anoxic stunning atmosphere must have an oxygen content of 2 Vol.-% and less.

In these stunning atmospheres, the use of nitrogen is preferred for economic reasons. Nevertheless, the density of air and nitrogen is close and, in particular, the density of nitrogen is slightly lower than the density of air having the same temperature. This creates stability issues regarding the anoxic properties of the stunning atmosphere as the nitrogen tends to rise due to its lower density.

SUMMARY OF THE INVENTION

The object of the invention is to improve the prior art to increase the stability of the stunning atmosphere in a pit for stunning animals before slaughter.

The object is solved with the method and the stunning system according to the independent claims. Advantageous refinements are presented in the dependent claims. The features described in the claims and in the description may be combined with each other in any technologically reasonable manner.

According to the present invention a method for stunning animals before slaughter is presented, wherein the animals are entered into a cradle which is lowered into a pit, the pit being filled with an anoxic stunning gas, wherein at the cradle a heat sink is positioned to cool the stunning gas in the pit while being lowered into the pit.

After stunning, the animals are slaughtered and processed. The term anoxic stunning gas is understood to have an oxygen content of 2 Vol.-% and less. The cradle may be a part of a dip-lift system or a part of a paternoster or Ferris wheel system where cradles are continuously guided through the pit. The animals are preferably pigs. Preferably, at least one animal per cycle is entered into the cradle.

The term heat sink is understood as a source of cold. It comprises or is filled with a cooling agent, preferably a material undergoing a phase change while absorbing heat (and, thus, providing cold). The phase change is preferably a sublimation or an evaporation. The heat sink comprises or forms a reservoir for the cooling agent. The heat sink is positioned at one of the walls of the cradle, preferably at the outside of the cradle to avoid that the heat sink is reachable for the animals to avoid harm for or injuries of the animals. The heat sink is in thermal contact with the stunning gas in the pit.

By the heat sink the stunning gas in the pit is cooled resulting in a density increase of the stunning gas. This reduces the risk of demixing of the stunning gas in case of gas mixtures and the risk of the stunning gas or components thereof rising out of the pit. All this would result in a change of composition of the stunning gas with the risk that the stunning gas in the pit is no longer anoxic. Further, a temperature rise of the stunning gas in the pit due to the introduction of warm animals is counteracted.

Preferably, the stunning gas comprises nitrogen. The density of nitrogen is only minimally different from the density of ambient air, in particular in a temperature range of 15° C. to 25° C. which is preferred for stunning the animals Therefore, the current invention is particularly suitable for stunning gas atmospheres comprising nitrogen. This may be mixtures of nitrogen with other gases, such as carbon dioxide and/or argon.

Carbon dioxide is frequently used as an addendum to stunning gases comprising nitrogen as by this the density difference of the stunning gas compared to ambient air is increased. By the use of the method as discussed herein the amount of carbon dioxide may be decreased and, depending on the circumstances, even reduced to zero. In general, a carbon dioxide amount of 0 Vol.-% to 30 Vol.-% is preferred.

Preferably the heat sink is positioned at the bottom side of the cradle, preferably below the bottom side of the cradle. With the heat sink being positioned at the bottom side of the cradle, in particular below the bottom side of the cradle, the heat sink is moved through the major part of the pit allowing an efficient cooling of the stunning gas in the pit. The bottom side is understood as the element supporting the animals, i.e., the floor on which the animals stand after entering the cradle. Preferably, the heat sink is positioned below the floor supporting the animals, in particular, a thermal insulation is mounted between the heat sink and the floor to avoid contact of the animals with the heat sink possibly creating harm for or injuries of the animals.

Preferably, the heat sink comprises solid carbon dioxide. Solid carbon dioxide is easily available and is easy to handle. It cools by sublimation to the gaseous state generating gaseous carbon dioxide. During sublimation the energy used to perform the phase transition (the sublimation heat) is withdrawn from the surroundings, i.e., from the stunning gas, cooling the same. The consumption of energy is about 25.1 kJ/mol of carbon dioxide so that solid carbon dioxide is an effective heat sink. The amount of solid carbon dioxide filled into the heat sink is preferably calculated depending on the needed cooling power.

Preferably, a gas stream passing the heat sink and/or passing the solid carbon dioxide in the heat sink may be controlled so that the cooling power of the heat sink may be controlled. Preferably, a fan is used to control the heat exchange power as a function of the cold demand. In hot seasons, the heat sink could also be used to provide pigs with a refreshing environment and, thus, a better well-being.

Preferably, gaseous carbon dioxide generated by sublimation of the solid carbon dioxide is vented from the heat sink to the outside of the heat sink. This avoids a pressure build up in the heat sink. Venting may be allowed constantly or only at specific times or time intervals allowing to purge the gaseous carbon dioxide in a predetermined way.

Preferably, the gaseous carbon dioxide is only vented, when the cradle is in the pit. This allows to use the gaseous carbon dioxide to enrich the stunning gas in the pit. This is preferred, if the stunning gas comprises a certain amount of carbon dioxide already. Preferably, venting is performed based on the carbon dioxide concentration in the stunning gas in the pit. For example, venting is preferably avoided if the carbon dioxide concentration in the pit is above a predetermined level. Furthermore, it is possible to vent the carbon dioxide, even while the cradle is in the pit, using a venting hose which may be connected in a gas-tight manner to a venting opening of the heat sink. This allows venting of the carbon dioxide without increasing the carbon dioxide concentration in the pit.

Alternatively, the gaseous carbon dioxide is only vented, when the cradle is outside the pit. This is in particular preferred, if no carbon dioxide is part of the stunning gas in the pit. In this case it is avoided to add carbon dioxide to the stunning gas. Carbon dioxide may be vented to the surroundings, in particular, if these are well ventilated, or it may be vented using a venting hose to another point or to a reservoir.

Preferably, the stunning gas in the pit is cooled by the heat sink by way of an indirect heat exchange through a thermally conductive and gas-tight wall. This allows to cool the stunning gas without introducing the phase change product such as gaseous carbon dioxide into the pit and the stunning gas. Preferably, the heat sink is completely surrounded by a thermally conductive and gas-tight wall with openings for providing liquid carbon dioxide to create solid carbon dioxide in the heat sink, for providing solid carbon dioxide to the heat sink, and/or for venting gaseous carbon dioxide.

According to another aspect of the invention a stunning system for stunning animals before slaughter is proposed, comprising a pit with filling equipment to maintain a stunning gas atmosphere in the pit, a cradle which may be lowered into and raised from the pit, which is characterized in that the cradle comprises a heat sink for cooling the stunning gas.

The term heat sink is to be understood as comprising or forming a reservoir for a cooling agent, which preferably cools the surroundings by a phase change such as a sublimation or an evaporation. Preferably, the stunning system is used to perform the method for stunning animals as described in this document.

Preferably, the stunning system further comprises a paternoster system for lowering and raising the cradle. The term paternoster system is understood as a system in which several cradles are moved simultaneously e.g., like a paternoster lift or a Ferris wheel, wherein each cradle passes the pit and, preferably, stops in the pit to ensure stunning while another cradle is emptied from stunned animals and conscious animals are entered into that cradle. The paternoster system is preferred if many animals have to be stunned and slaughtered in a short amount of time.

Alternatively, the stunning system further comprises a dip lift system for lowering and raising the cradle. A dip-lift system functions generally like an elevator or lift in which the cradle is lowered into and raised out of the pit in a vertical direction. This system has a smaller footprint than a paternoster system and is preferred if the number of animals to be slaughtered per time is smaller.

Preferably, the heat sink comprises a reservoir for solid carbon dioxide. Preferably, the reservoir itself is perforated, allowing sublimated gaseous carbon dioxide to move outside the reservoir. This gaseous carbon dioxide can either be collected within the heat sink allowing a pressure buildup of carbon dioxide gas therein or it may be vented. Preferably, the heat sink comprises a venting opening. Through this opening the gaseous carbon dioxide may be vented continuously or intermittently. In the latter case the venting periods may be adapted to the position of the cradle. For example, if carbon dioxide is a component of the stunning atmosphere venting may be performed while the heat sink is inside the pit. If carbon dioxide is not a component of the stunning atmosphere, venting may be performed while the heat sink is outside the pit. In the latter case the venting may be performed into the surroundings, in particular, if a sufficient ventilation is ensured. Alternatively, the venting opening may be connected to a venting hose for discharging the carbon dioxide.

Preferably, the heat sink comprises a thermally conductive and gas tight wall. This allows to cool the stunning gas indirectly, i.e., without venting carbon dioxide or other gases into the stunning gas. Preferably, the thermally conductive and gas-tight wall forms the whole envelope of the heat sink having openings for providing carbon dioxide and/or for venting carbon dioxide.

Preferably, the heat sink is positioned at the bottom side of the cradle. This maximizes the duration of contact between the heat sink and the stunning gas increasing the efficiency of cooling of the stunning gas in the pit.

Preferably, the heat sink further comprises a fan. By use and control of the fan a gas stream passing the heat sink and/or passing solid carbon dioxide within the heat sink may be controlled allowing to control the cooling power of the heat sink.

The advantages and features of the stunning method are transferrable to the stunning system, and vice versa.

BRIEF DESCRIPTION OF THE FIGURES

In the following the invention will be described with respect to the figures. The figures show preferred embodiments, to which the invention is not limited. The figures and the dimensions shown therein are only schematic. The figures show.

DETAILED DESCRIPTION OF THE INVENTION

Figure 1:
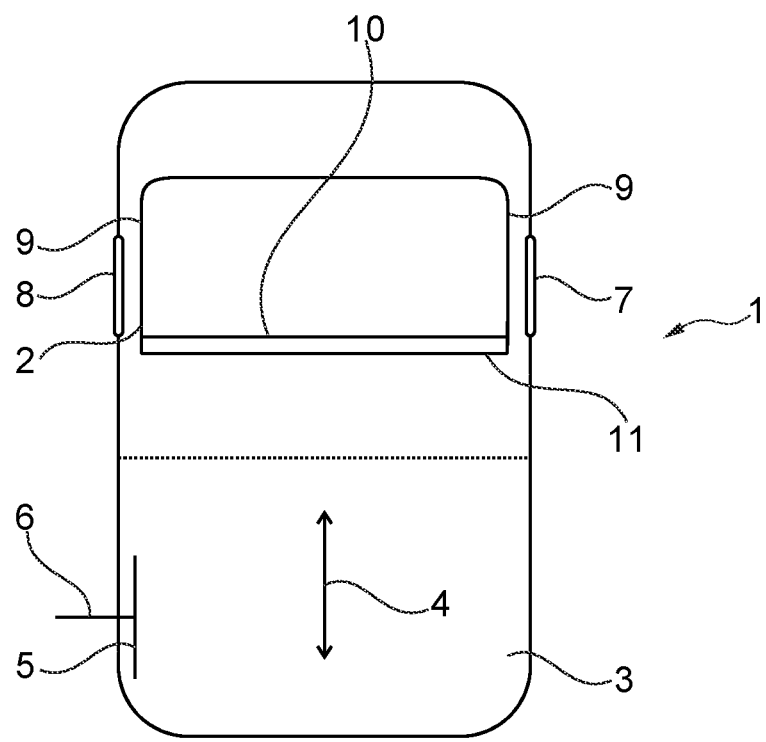
FIG. 1 is a first example of a stunning system with a dip-lift system.

FIG. 1 displays schematically a first example of a stunning system 1. The stunning system 1 comprises a cradle 2 which may be lowered into a pit 3 and raised out of the pit 3 in a vertical direction 4. Via a filling equipment 5 an atmosphere of stunning gas is created and maintained in the pit 3. The filling equipment 5 is connected to a feed line 6 by which the gas is provided to the filling equipment 5 from one or more reservoirs. The stunning gas is anoxic. This means that the oxygen content in the stunning gas and, thus, in the pit 3 is below 2 Vol.-% which results in a stunning of the animals due to oxygen deprivation which is less stressful for the animal than the inhalation of a gas with a high amount, such as 30 Vol.-% and more, of carbon dioxide. Preferably, the stunning gas comprises nitrogen, preferably at least 90 Vol.-% nitrogen. The gas provided to the filling equipment 5 is either the stunning gas or at least one component of the stunning gas necessary to keep the stunning gas in the pit 3 anoxic.

The stunning equipment 1 comprises a first door 7 through which conscious animals, in particular pigs, enter the cradle 2 and a second door 8 through which unconscious animals are removed from the cradle 2. The doors 7, 8 coincide with respective openings 9 in the cradle 2, if the cradle 2 is in its upper position as shown in FIG. 1.

Figure 2:
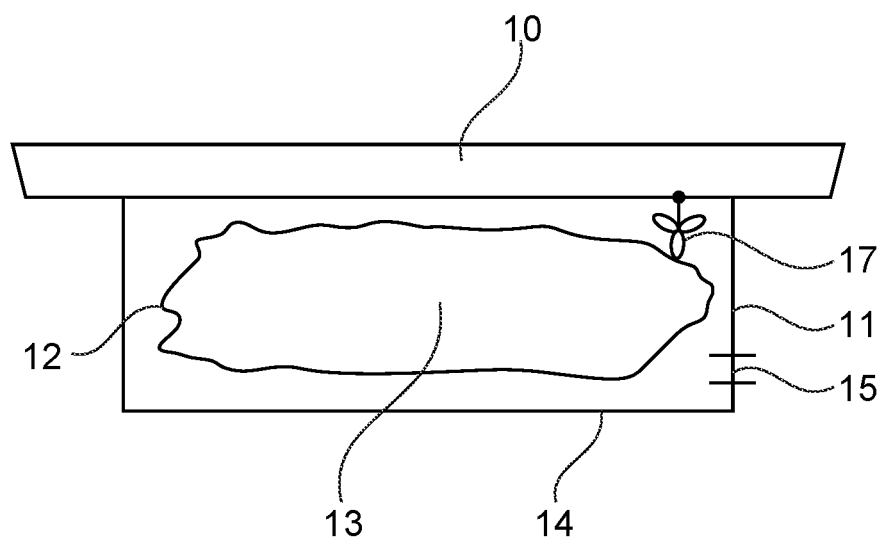
FIG. 2 is a first example of a heat sink to be used in an example of a stunning system.

Ata bottom side 10 of the cradle 2 and below the cradle 2 a heat sink 11 is positioned. This heat sink 11 comprises a reservoir of a cooling agent which cools by a phase change, e.g., by an evaporation, melting or sublimation process. The heat sink is discussed in more detail with regard to a preferred embodiment shown in FIG. 2 displaying a first example of a heat sink 11. The heat sink 11 comprises a reservoir 12 for the cooling agent which is in this case solid carbon dioxide 13. Alternatively, the solid carbon dioxide 13 may be introduced directly into the heat sink 11 without a further reservoir 12. The carbon dioxide may be provided in the form of snow and/or ice. The actual composition of the carbon dioxide and its amount is calculated based on the necessary cooling power needed to cool the stunning gas in the pit 3. In particular, snow is preferred if a larger cooling power is necessary due to its large surface while ice is preferred if a lower cooling power is necessary. The reservoir 12 has at least in part perforated walls allowing carbon dioxide to leave the reservoir 12 into the heat sink 11 after sublimation. The reservoir 12 may be e.g., a bag or a solid cage. The solid carbon dioxide 13 may be filled into the reservoir 12 outside the heat sink 11, so that the filled reservoir 12 may be introduced into the heat sink 11. Alternatively, the solid carbon dioxide 13 may be generated in the reservoir 12 in the heat sink 11 in situ by expanding pressurized liquid carbon dioxide into the reservoir 12. The reservoir 12 preferably corresponds with the heat sink 11, i.e., the heat sink 11 forms simultaneously the reservoir 12.

The heat sink 11 has walls 14 which are gas tight but thermally conductive allowing an indirect cooling of the stunning gas in the pit 3 by heat exchange. The gaseous carbon dioxide building up within the heat sink 11 may be allowed to build up pressure inside the heat sink 11 which is reduced by venting gaseous carbon dioxide. This venting is performed through at least one venting opening 15 which is preferably a venting nozzle which may be opened and closed. This allows to vent the gaseous carbon dioxide depending on e.g., the pressure within the heat sink 11 or depending on the position of the heat sink 11. For example, if the stunning gas in the pit 3 comprises carbon dioxide it is possible to vent the gaseous carbon dioxide by opening the venting opening 15 while the heat sink 11 is inside the pit 3 to enrich the stunning gas with carbon dioxide. If, alternatively, the stunning gas in the pit 3 does not contain carbon dioxide or has a significant high carbon dioxide content the gaseous carbon dioxide is vented by opening the venting opening 15 when the heat sink 11 is not in the pit 3. Preferably, the venting opening 15 is then connected to a venting hose (not shown) to avoid an increase of the concentration of carbon dioxide in the atmosphere around the stunning system 1, in particular, if no sufficient ventilation may be ensured. Furthermore, the heat sink 11 comprises a fan 17, preferably a fan 17 the rotational speed of which may be controlled. By changing the rotational speed of the fan 17 the volume flow of gas being in contact with the reservoir 12 and/or the solid carbon dioxide 13 may be adjusted. By adjusting the volume flow of gas being in contact with the reservoir 12 the cooling power of the heat sink 11 may be adjusted.

Now returning to FIG. 1, when the cradle 2 is lowered into the pit 3 the heat sink 11 and the phase change of the cooling agent, in this example the sublimation of the solid carbon dioxide 13, cools the stunning gas in the pit 3. This increases the density of the stunning gas. In particular for the nitrogen content of the stunning gas this means that a density difference between cooled nitrogen and the air at ambient temperature outside the pit 3 or outside the stunning system 1 is created or increased reducing effects of demixing and, in general, the tendency of the nitrogen to rise due to its lower density compared to the warmer air outside the stunning system 1. This ensures the anoxic properties of the stunning gas and reduces the consumption of stunning gas while ensuring at the same time a safe and less stressful stunning of the animals. The stability of the stunning gas in the pit 3 is improved.

Figure 3:
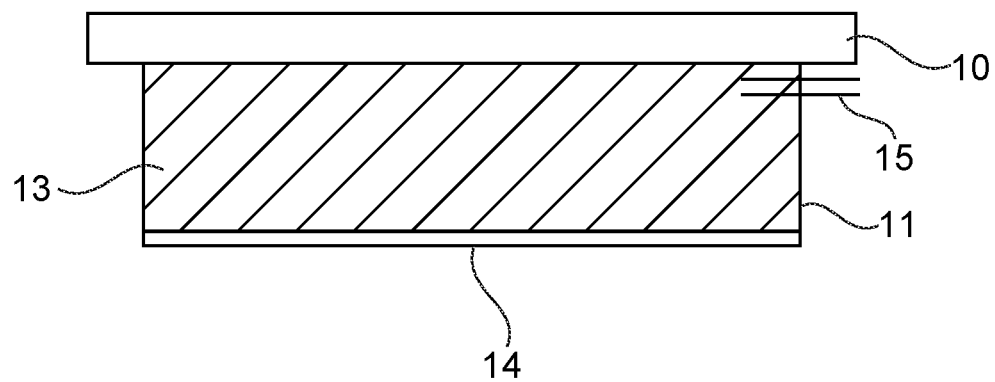
FIG. 3 is a second example of a heat sink to be used in an example of a stunning system.

FIG. 3 displays a second example of a heat sink 11. To avoid repetitions only the differences compared to the first example of a heat sink 11 displayed in FIG. 2 and discussed above are described. Reference is made to the above description of the first example of the heat sink 11 which is applicable to the second example of a heat sink 11 as well. In this example the heat sink 11 does not comprise a further reservoir 12. Here, the solid carbon dioxide 13 is directly implemented in or introduced into the heat sink 11 itself. The use of this second example of a heat sink 11 is in particular preferred, when the solid carbon dioxide 13 is generated within the heat sink 11 by expanding liquid carbon dioxide.

Figure 4:
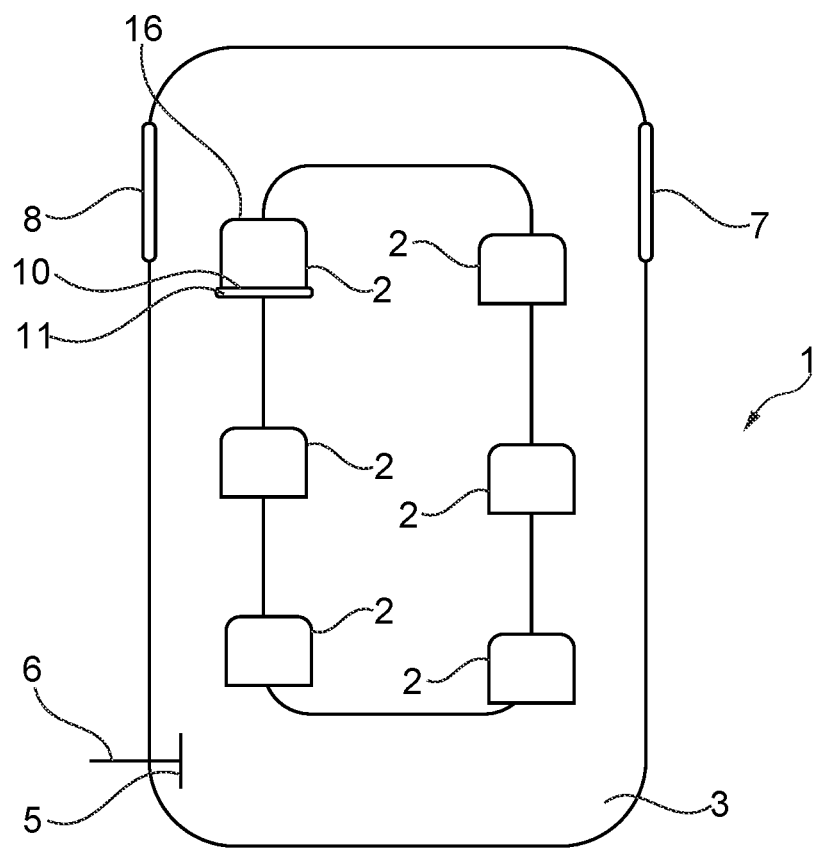
FIG. 4 is a second example of a stunning system with a paternoster system.

FIG. 4 displays a second example of a stunning system 1. To avoid repetitions only the differences compared to the first example of a stunning system 1 displayed in FIG. 1 to FIG. 3 and discussed above are described. Reference is made to the above description of the first example of a stunning system 1 which is applicable to the second example of a stunning system 1 as well. The second example of a stunning system 1 is a paternoster system. It comprises in this example six cradles 2 for transporting animals to and from the pit 3. Other stunning systems 1 with different numbers of cradles are possible as well according to the invention. The pit 3 is filled with stunning gas via the feedline 6 connected to a filling equipment 5.

One of the cradles 2 is a cooling cradle 16 having a heat sink 11 according to the first example (FIG. 2) or the second example (FIG. 3) at the bottom side 10 of the cooling cradle 16. In this example only one cradle 2 is provided with a heat sink 11. It is equally preferred to have more than one cradle 2 equipped with a heat sink 11.

A method for stunning animals and a respective stunning system 1 is disclosed. Animals are lowered in a cradle 2, 16 into a pit 3 filled with anoxic stunning gas. The cradle 2, 16 is provided with a heat sink 11, preferably comprising solid carbon dioxide 13, for cooling the stunning gas in the pit 3 resulting in a density increase of the stunning gas in the pit 3. This reduces demixing of the stunning gas and rising of components such as nitrogen (N₂) usually having a lower density than the air surrounding the stunning system 1.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it may be recognized by those skilled in the art that certain steps may be combined into a single step.

The singular forms "a", "an" and "the" include plural referents, unless the context clearly dictates otherwise.

"Comprising" in a claim is an open transitional term which means the subsequently identified claim elements are a nonexclusive listing i.e, anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

"Range" or "ranging" may be expressed herein as from about one particular value, and/or to about another particular value. When such a range is expressed, it is to be understood that another embodiment is from the one particular value and/or to the other particular value, along with all combinations within said range. Any and all ranges recited herein are inclusive of their endpoints (i.e., x=1 to 4 or x ranges from 1 to 4 includes x=1, x=4, and x=any number in between), irrespective of whether the term "inclusively" is used.

All references identified herein are each hereby incorporated by reference into this application in their entireties, as well as for the specific information for which each is cited.

Although the subject matter described herein may be described in the context of illustrative implementations to process one or more computing application features/operations for a computing application having user-interactive components the subject matter is not limited to these particular embodiments. Rather, the techniques described herein may be applied to any suitable type of user-interactive component execution management methods, systems, platforms, and/or apparatus.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

REFERENCE NUMERALS 1 stunning system
2 cradle
3 pit
4 vertical direction
5 filling equipment
6 feed line
7 first door
8 second door
9 opening
10 bottom side
11 heat sink
12 reservoir
13 solid carbon dioxide
14 wall
15 venting opening
16 cooling cradle
17 fan

The invention claimed is:

1. A method for stunning animals before slaughter, comprising
having the animals enter into a cradle which is lowered into a pit; and
filling the pit with a stunning gas,
wherein at the cradle a heat sink is positioned to cool the stunning gas in the pit while being lowered into the pit.

2. The method according to claim 1, wherein the stunning gas comprises nitrogen.

3. The method according to claim 1, wherein the heat sink is positioned at the bottom side of the cradle.

4. The method according to claim 1, wherein the heat sink comprises solid carbon dioxide.

5. The method according to claim 4, wherein gaseous carbon dioxide generated by sublimation of the solid carbon dioxide is vented from the heat sink to the outside of the heat sink.

6. The method according to claim 5, wherein gaseous carbon dioxide is only vented, when the cradle is in the pit.

7. The method according to claim 5, wherein gaseous carbon dioxide is only vented, when the cradle is outside the pit.

8. The method according to claim 1, wherein the stunning gas in the pit is cooled by the heat sink by way of an indirect heat exchange through a thermally conductive and gas-tight wall.

9. A stunning system for stunning animals before slaughter, comprising
a pit with filling equipment to maintain a stunning gas atmosphere in the pit; and
a cradle which is lowered into and raised from the pit,
wherein the cradle comprises a heat sink for cooling the stunning gas.

10. The system according to claim 9, further comprising a paternoster system for lowering and raising the cradle.

11. The system according to claim 9, further comprising a dip lift system for lowering and raising the cradle.

12. The system according to claim 9, wherein the heat sink comprises a reservoir for solid carbon dioxide.

13. The system according to claim 9, wherein the heat sink comprises a thermally conductive and gas tight wall.

14. The system according to claim 9, wherein the heat sink is positioned at the bottom side of the cradle.

15. The system according to claim 9, wherein the heat sink comprises a fan.

* * * * *